United States Patent
Tanaka et al.

(10) Patent No.: US 7,537,267 B2
(45) Date of Patent: May 26, 2009

(54) HATCHBACK DOOR STRUCTURE FOR VEHICLES

(75) Inventors: Takeki Tanaka, Saitama (JP);
Tomofumi Ichinose, Saitama (JP);
Kenichi Munenaga, Saitama (JP);
Kazuhiko Yamada, Saitama (JP);
Yoshitomo Ihashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/657,239

(22) Filed: Jan. 24, 2007

(65) Prior Publication Data
US 2007/0170751 A1 Jul. 26, 2007

(30) Foreign Application Priority Data

Jan. 26, 2006 (JP) ............................. 2006-017032
Mar. 9, 2006 (JP) ............................. 2006-064021

(51) Int. Cl.
*B60J 5/10* (2006.01)
(52) U.S. Cl. .................... 296/146.6; 296/146.8; 49/502
(58) Field of Classification Search ............. 296/146.5, 296/146.6, 146.8, 146.9, 191, 56, 106; 49/502
See application file for complete search history.

(56) References Cited

U.S. PATENT DOCUMENTS

| | | | | | |
|---|---|---|---|---|---|
| 5,314,228 | A | * | 5/1994 | Figge, Sr. ................. | 296/146.6 |
| 6,003,931 | A | * | 12/1999 | Dancasius et al. ........ | 296/146.8 |
| 6,053,562 | A | * | 4/2000 | Bednarski ................ | 296/146.5 |
| 6,776,449 | B2 | * | 8/2004 | Komatsu et al. .......... | 296/146.5 |
| 6,929,308 | B2 | * | 8/2005 | Komatsu et al. .......... | 296/146.5 |
| 7,306,279 | B2 | * | 12/2007 | Saitoh ..................... | 296/146.8 |
| 2007/0145768 | A1 | * | 6/2007 | Saitoh et al. ............. | 296/146.5 |
| 2007/0145773 | A1 | * | 6/2007 | Saitoh ..................... | 296/146.8 |
| 2007/0210613 | A1 | * | 9/2007 | Tanaka et al. ............ | 296/146.6 |
| 2008/0030047 | A1 | * | 2/2008 | Munenaga et al. ....... | 296/146.6 |

FOREIGN PATENT DOCUMENTS

| | | |
|---|---|---|
| AT | 7550 U1 | 5/2005 |
| DE | 196 35 873 A1 | 3/1998 |
| JP | 62-113615 | 5/1987 |
| JP | 08-258568 | 10/1996 |
| JP | 10-100684 | 4/1998 |
| JP | 11-514613 | 12/1999 |
| JP | 2000-118445 | 4/2000 |

* cited by examiner

*Primary Examiner*—Dennis H Pedder
*Assistant Examiner*—Melissa A Black
(74) *Attorney, Agent, or Firm*—Carrier, Blackman & Associates, P.C.; Joseph P. Carrier; William D. Blackman

(57) ABSTRACT

A hatchback door structure for vehicles which includes an inner panel arranged on an inner side of a vehicle; and an outer panel arranged on an outer side of the vehicle, wherein the inner panel includes a frame which has a shape outlining an outer shape of the hatchback door, and a pair of stiffening ribs which is integrally formed with the frame and extends approximately in a V-shape to both side portions of the frame from a bottom side of the frame. Further, the inner panel is integrally formed by press-forming and includes a discrete lateral beam which is fixed and extends between jointing portions of the side portions of the frame and stiffening ribs, wherein, the discrete lateral beam is formed by press-forming, and a window frame on which a window glass is fixed is formed in an upper portion of the frame.

16 Claims, 15 Drawing Sheets

Cross sectional view taken along N-N line of FIG.10A

FIG.12A
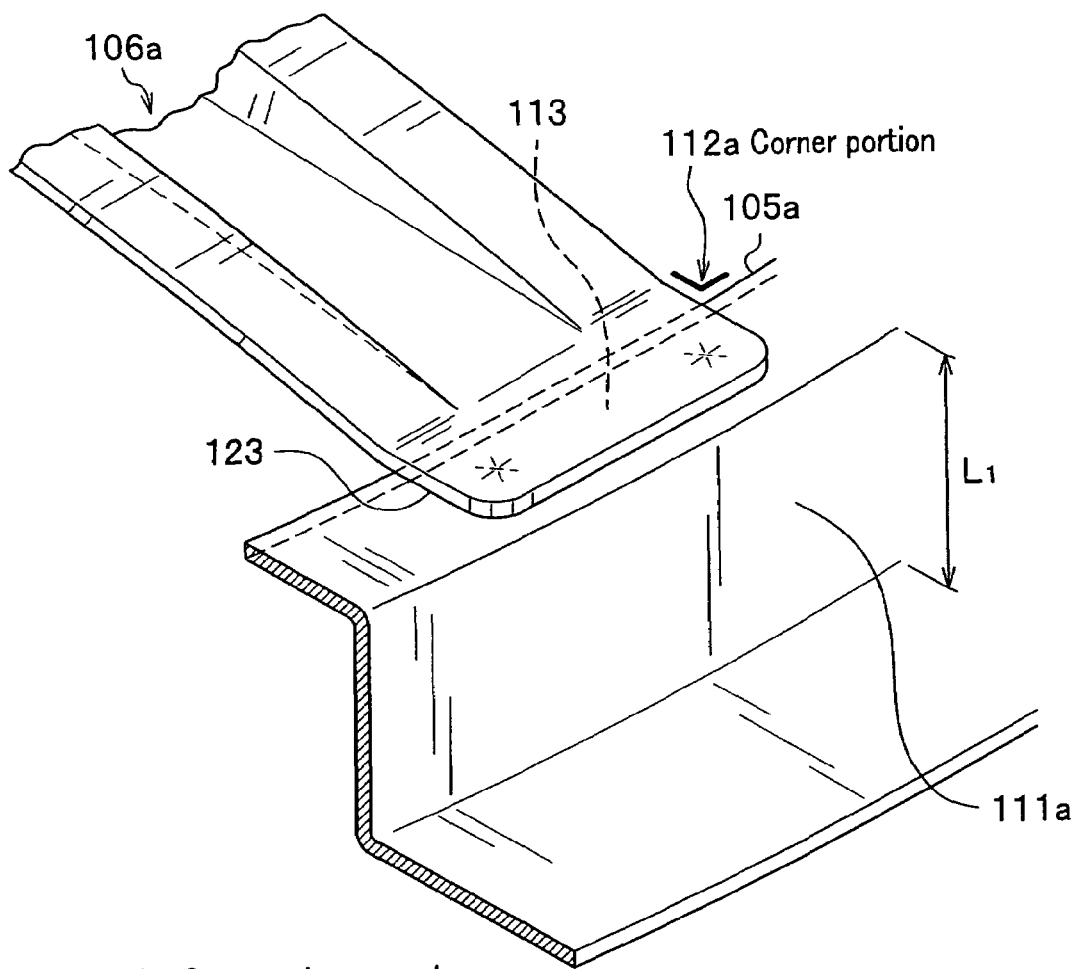
FIG.12B Comparative example
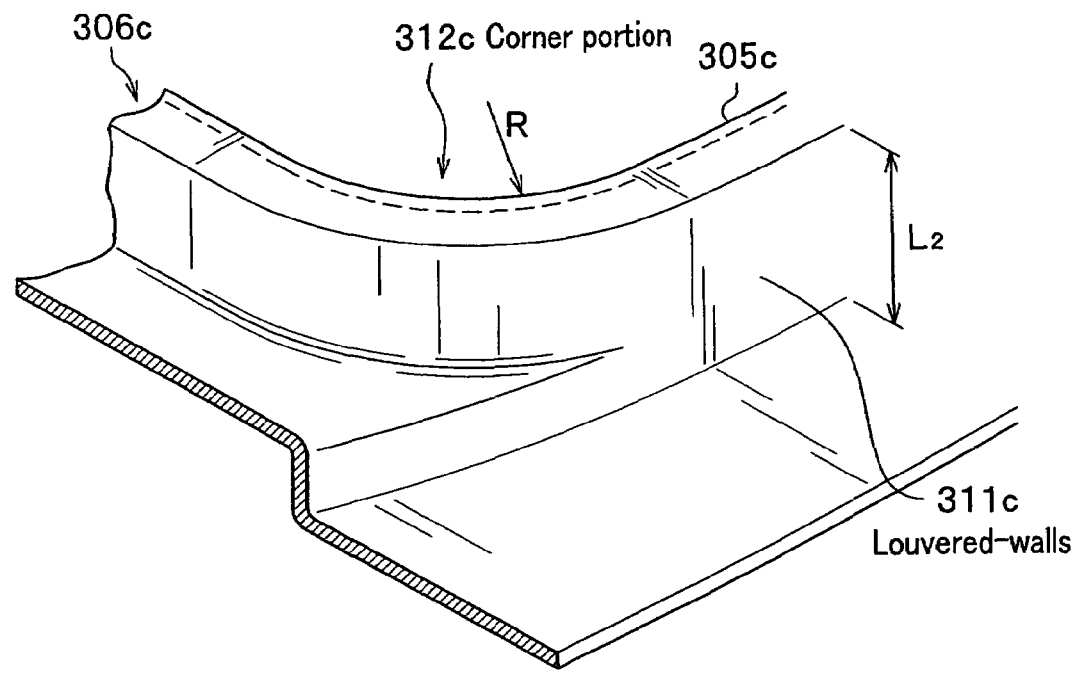

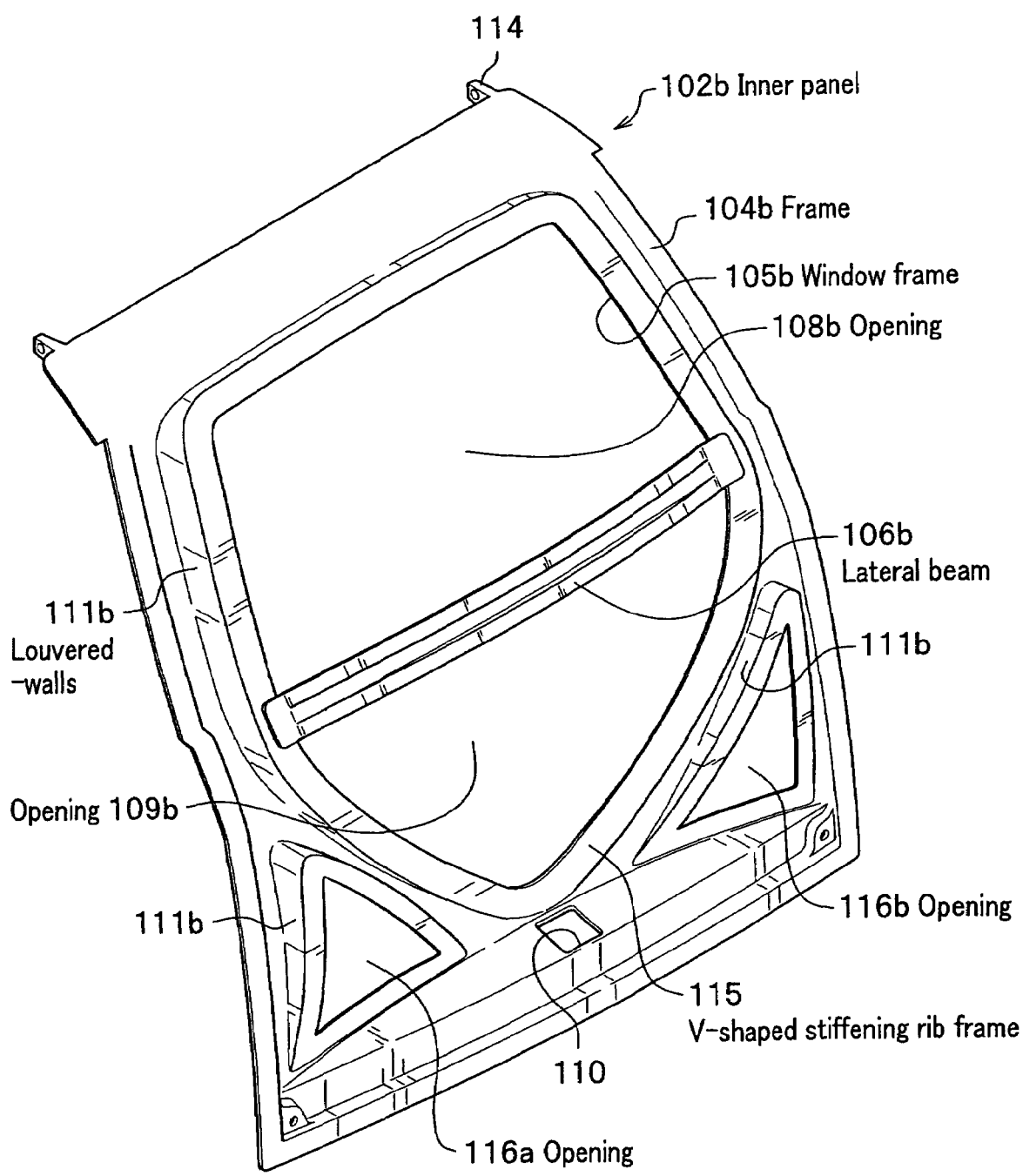

HATCHBACK DOOR STRUCTURE FOR VEHICLES

CROSS REFERENCE TO RELATED APPLICATIONS

This application claims the foreign priority benefit under Title 35, United States Code, § 19(a)-(d) of Japanese Patent Application Numbers 2006-017032, filed on Jan. 26, 2006, and 2006-064021, filed on Mar. 9, 2006, the contents of which are hereby incorporated by reference.

BACKGROUND OF THE INVENTION

1. Field of the Invention

The present invention relates to a hatchback door structure for vehicles, which is light and rigid.

2. Description of the Background Art

A hatchback door structure has been known, which includes an inner panel in which a lateral beam is integrally formed with a frame which has a shape outlining an outer shape of the hatchback door so that the lateral beam divides the frame into an upper portion and a lower portion (for example, refer to paragraphs 0010 to 0015 and FIG. 1 of Japanese Patent Laid-Open Publication Kokai No. H08-258568). Here, FIG. 14 is a schematic illustration of a vehicle seen from a backside for explaining a conventional hatchback door structure. As shown in FIG. 14, a hatch back door 201 of a vehicle V includes an inner panel 206 comprising a frame 209 and a lateral beam 218. A window glass 207 is fixed in an opening 212a zoned by the frame 209 and the lateral beam 218 on an upper side of the lateral beam 218. In an opening 212b zoned by the frame 209 and the lateral beam 218 on a lower side of the lateral beam 218, a pair of joint reinforcements 200a is disposed. A lower end of each reinforcement 200a is welded on the frame 209 through a lock reinforcement 200b which is fixed at a center of a bottom side of the frame 209. The pair of the joint reinforcements 200a extends in a V-shape to each upper corner of the opening 212b. An upper end of the joint reinforcement 200a is welded on the frame 209 and the lateral beam 218 through a corresponding corner reinforcement 200c which is fixed on a corresponding upper corner of the opening 212b.

In the hatchback door structure 201, a rigidity of the inner panel 206 is increased by disposing the pair of joint reinforcements 200a in the opening 212b.

Generally, a hatchback door fitted up on a tailgate in a rear part of a vehicle is jointed to the vehicle with a hinge structure. An opening-closing motion of the hatchback door is performed by rotating the door about the hinge located at the upper end of the door. These types of hatchback doors are required to increase the rigidity for improving collision strength and for avoiding muffled sounds when a vehicle runs a punishing road. On the other hand, the hatchback door must be light for reducing fuel consumption of a vehicle and improving easiness of the opening-closing motion of the door. Because of the above reasons, most of conventional hatchback doors for vehicles have a structure combining a thin outer panel and a thin inner panel which has openings, and the structure is reinforced by utilizing shapes of the both panels.

FIG. 15 is a perspective view showing an example of an inner panel which configures a conventional hatchback door structure. In an inner panel 302c of the example, a frame 304c which outlines an outer shape of the hatchback door is formed. In an upper portion of the frame 304c, a window frame 305c is formed and an opening 308c in which a window glass is to be set is disposed. An opening 309c is disposed in a lower portion of the inner panel 302c for weight saving. In the inner panel 302c, a lateral beam 306c which separates the two openings 308c, 309c is formed. The lateral beam 306c is integrally formed with the frame 304c by press-forming. The lateral beam 306c is a component for increasing a rigidity of the inner panel 302c against a lateral bending. Examples disclosed in Japanese Patent No. 3013921 and Japanese Unexamined Patent Publication Kohyo No. 11-514613 have identical contents with that of the aforementioned example, in which openings of the inner panel disposed for weight saving are reinforced by a beam or reinforcement and the like.

However, in the hatchback door structure 201 in FIG. 14, the discrete joint reinforcements 200a are welded on the frame 209 and the lateral beam 218, while requiring other members such as the lock reinforcement 200b and the corner reinforcements 200c for welding the joint reinforcements 200a. Therefore, the manufacturing cost becomes high, and at the same time, a weight of the hatchback door structure 201 increases. Further, a working process increases due to necessity of the welding.

In addition, in FIG. 15, since the lateral beam 306c for reinforcing the inner panel 302c, which is used for a conventional hatchback door structure, is integrally formed with the frame 304c when the inner panel 302c is formed by press-forming, there are following problems.

The first problem is as follows. When the lateral beam 306c is integrally formed as in the inner panel 302c shown in FIG. 15, a formation of cut-and-turned-up walls (hereinafter, referred to as louvered-walls) 311c with a sufficient height formed on peripheries of the openings 308c, 309c of the inner panel 302c is difficult due to a limitation in press formability, unless a highly-ductile material is used for the panel. Therefore, an increase of the rigidity of the inner panel 302c is limited.

The second is as follows. Corners 312c, where the lateral beam 306c and the frame 304c of the inner panel 302c are jointed, are required to have a radius R larger than a predetermined value. As a result, a size of the opening 308c for the rear glass window should be made smaller, which narrows a rearward visibility of a vehicle.

The third is as follows. Improvement of the rigidity of the inner panel 302c against bending in a tangential direction relative to a circular path formed by the rotation circle of the hatchback door is difficult. When a hatchback door is closed, the hatchback door receives a force in the tangential direction. Therefore, if the louvered-walls 311c of the lateral beam 306c are formed in parallel with the tangential direction, the vibrations of the hatchback door are effectively suppressed. However, since an inclination of the louvered-walls 311c of the lateral beam 306c is determined by a direction of the press-forming of the inner panel 302c, the louvered-walls 311c may not be inclined in the effective direction for suppressing the vibrations of the hatchback door when the door is closed.

The fourth is as follows. Since the lateral beam 306c is integrally formed with the inner panel 302c, a panel thickness of the lateral beam 306c can not easily be made different from that of the inner panel 302c. For example, changes in design to thin the panel thickness of the lateral beam 306c for the weight saving thinner than that of the frame 304c can not be performed.

It is, therefore, desired to provide a hatchback door structure for vehicles, which is light and capable of increasing a rigidity of the hatchback door structure, as well as capable of reducing a manufacturing process and cost.

It is also desired to provide a hatchback door structure for vehicles, which can improve a rearward visibility of a vehicle.

SUMMARY OF THE INVENTION

According to a first aspect of the present invention, there is provided a hatchback door structure for vehicles which comprises: an inner panel which is arranged on an inner side of a vehicle; and an outer panel which is arranged on an outer side of the vehicle, wherein the inner panel comprises a frame which has a shape outlining an outer shape of the hatchback door, and a pair of stiffening ribs which is integrally formed with the frame and extends approximately in a V-shape to both side portions of the frame from a bottom side of the frame.

In the hatchback door structure, the inner panel is formed so that the pair of stiffening ribs extends approximately in a V-shape from the bottom side to the both side portions of the frame which has the shape outlining the outer shape of the hatchback door. That is, in the hatchback door structure, by securing an opening as large as possible on the inner panel due to utilization of the frame and stiffening ribs, the weight saving can be achieved, as well as increase in the rigidity.

In addition, in the hatchback back door structure, since the frame and stiffening ribs are integrally formed, a plurality of reinforcements become unnecessary in contrast with the conventional hatchback door (for example, refer to Japanese Patent Laid-Open Publication No. H08-258568), resulting in the weight saving and a reduction of the manufacturing cost.

Further, in the hatchback back door structure, since the plurality of reinforcements become unnecessary in contrast with the conventional hatchback door (for example, refer to Japanese Patent Laid-Open Publication No. 08-258568), the welding of the reinforcements becomes unnecessary, resulting in reduction of the working process of the manufacturing.

A smoothly continuous surface portion may preferably but not necessarily be formed at a connection part of a side portion of the frame and stiffening rib.

In the hatchback door structure, since there is not a bended portion where stresses tend to be concentrated, that is, since the smooth and continuous surface portion is formed at a connection part of the side portion of the frame and the stiffening rib, the rigidity can be further increased.

The pair of the stiffening ribs may preferably but not necessarily extend approximately in a V-shape from a locking device fixing portion which is formed on the bottom part of the frame to each of the couple of side portions of the frame, the locking device fixing portion being configured for fixing a locking device.

In the hatchback door structure, since the stiffening ribs extend approximately in a V-shape from the locking device fixing portion, the rigidity is further increased.

The inner panel may preferably but not necessarily have louvered-walls which are integrally formed with the inner panel, protrude outward to an outer panel side and are jointed to the outer panel.

In the hatchback door structure, since the louvered-walls formed in the inner panel are jointed to the outer panel, the rigidity is further increased. In addition, in the hatchback door structure, since the louvered-walls are formed by cutting and turning up the panel when they are integrally formed with the inner panel, the louvered-walls can be formed easily at desired positions and with optimal shapes.

On an upper side of the stiffening ribs, a first opening may preferably but not necessarily be defined by the stiffening ribs and the frame, on a lower side of one of the stiffening ribs, a second opening be defined by the one of the stiffening ribs and the frame, and on a lower side of the other stiffening rib, a third opening be defined by the other stiffening rib and the frame.

In the hatchback door structure, since the first opening, the second opening, and the third opening are formed on the inner panel, openings can be formed as large as possible to cover a broader area of the inner panel. As a result, the hatchback door structure can achieve the weight saving, as well as improvement of the rigidity.

The inner panel further may preferably but not necessarily comprise a lateral beam which extends between jointing portions of the side portions of the frame and stiffening ribs, and is integrally formed with the inner panel by press-forming.

In the hatchback door structure, since the lateral beam is formed to extend between the jointing portions of the side portions of the frame and the stiffening ribs, the rigidity is further increased. In addition, since the lateral beam is integrally formed with the frame and the stiffening ribs, a manufacturing process of the hatchback door structure (inner panel) can be simplified.

The inner panel may preferably but not necessarily be integrally formed by press-forming, and further comprise a discrete lateral beam which extends between jointing portions of the side portions of the frame and stiffening ribs.

In the hatchback door structure, by forming the discrete lateral beam which is different from the frame and the stiffening ribs, the press-forming of the inner panel can be performed easily and a flexibility in the press-forming can be increased. Accordingly, a larger opening can be secured in the inner panel.

The discrete lateral beam may preferably but not necessarily be formed in a circular arc so that the lateral beam protrudes in convex to an outer side of a vehicle, and a size of a cross section of the lateral beam gradually becomes smaller from a center to both ends of the lateral beam.

In the hatchback door structure, the discrete lateral beam is formed in a circular arc so that the lateral beam protrudes in convex to an outer side of a vehicle, and curves along an outer side of the hatchback door. If a heavy object such as a motor of a wiper is fixed at a center portion of the lateral beam, a large stress is generated at the center portion. In the hatchback door structure, even if the size of the cross section of the center portion is increased for supporting the heavy object with the center portion of the lateral beam, the weight saving of the lateral beam can be achieved, because the size of the cross section of the lateral beam gradually becomes smaller from the center to both ends of the lateral beam.

The discrete lateral beam may preferably but not necessarily be arranged so that a protruded direction of the lateral beam which is approximately perpendicular to an extending direction of the lateral beam is directed along an opening-closing direction of the hatchback door.

In the hatchback door structure, the lateral beam has a sufficient rigidity against a stress applied to the lateral beam, especially, when closing the hatchback door.

Each fixing portion of the discrete lateral beam on each jointing portion may preferably but not necessarily be formed so that the each fixing portion is arranged on a same plane defined in a vehicle width direction.

In the hatchback door structure, since a stress applied to the lateral beam, especially when closing the hatchback door, is uniformly transferred to each of the fixing portion, a load on the fixing portion of the lateral beam can be uniformly dispersed.

In addition, in the hatchback door structure, since the lateral beam is fixed on the same plane, a positioning of the lateral beam relative to the jointing portion becomes easy, thereby resulting in improvement of workability for fixing the lateral beam.

The discrete lateral beam may preferably but not necessarily be formed by press-forming, and a window frame on which a window glass is fixed be formed in an upper portion of the frame.

In the hatchback door structure, the inner panel and the lateral beam to be jointed to the inner panel can be formed independently. Therefore, each of the members (inner panel and lateral beam) can be formed in an optimal shape for increasing the rigidity of the hatchback door structure.

The discrete lateral beam and the inner panel can be formed with different press directions to each other.

In the hatchback door structure, flexibility in the press-forming for the inner panel and lateral beam can be increased.

The discrete lateral beam may preferably but not necessarily be fixed at approximately right angle against the frame of the inner panel at both bottom corners of the window frame.

In the hatchback door structure, an area of the glass window at the bottom corners can be enlarged. As a result, a visibility in the bottom corners of the glass window can be improved.

Structures of the inner panel and the discrete lateral beam may preferably but not necessarily have different cross sectional widths to each other in an inside-outside direction of the hatchback door.

In the hatchback door structure, regardless of a press-formability of the lateral beam, the structures of the frame of the inner panel can be designed thicker in the inside-outside direction of the hatchback door. As a result, the rigidity of the hatchback door structure can be increased.

The inner panel and the discrete lateral beam may preferably but not necessarily have different panel thicknesses to each other.

In the hatchback door structure, the weight saving of the hatchback door structure can be achieved by thinning the panel thickness of the lateral beam.

A material of the inner panel and a material of the discrete lateral beam may preferably but not necessarily be different to each other.

In the hatchback door structure, the weight saving of the hatchback door structure can be achieved by forming the lateral beam with, for example, aluminum alloy.

A hatchback door structure for vehicles according to the present invention can achieve the weight saving, while maintaining a sufficient rigidity. Further, the working process and manufacturing cost of the hatchback door structure can be reduced.

In addition, the press-formability of the inner panel can be improved and the degree of freedom of the inner panel shape can be increased without using a highly-ductile panel material. As a result, the rigidity of the inner panel can be further increased. In addition, by enlarging the opening for the rear glass window compared with the conventional one, a rearward visibility of a vehicle can be widened. In addition, the direction of the press-forming of the discrete lateral beam can be optimized for increasing the rigidity of the hatchback door which is necessary for suppressing the vibrations of the hatchback door at closing the door. Further, a panel thickness of the discrete lateral beam can be changed for, for example, the weight saving.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 12A is an enlarged view of a portion B in FIG. 9 on which a lateral beam of an inner panel according to the third embodiment is welded;

FIG. 12B is an enlarged view of a portion P in FIG. 15 on which a lateral beam of an inner panel according to a conventional example is welded;

FIG. 13 is a perspective view of an inner panel reinforced by a V-shaped stiffening rib which is used for another embodiment of the present invention;

DETAILED DESCRIPTION OF ILLUSTRATIVE EMBODIMENTS

First Embodiment

Figure 1:
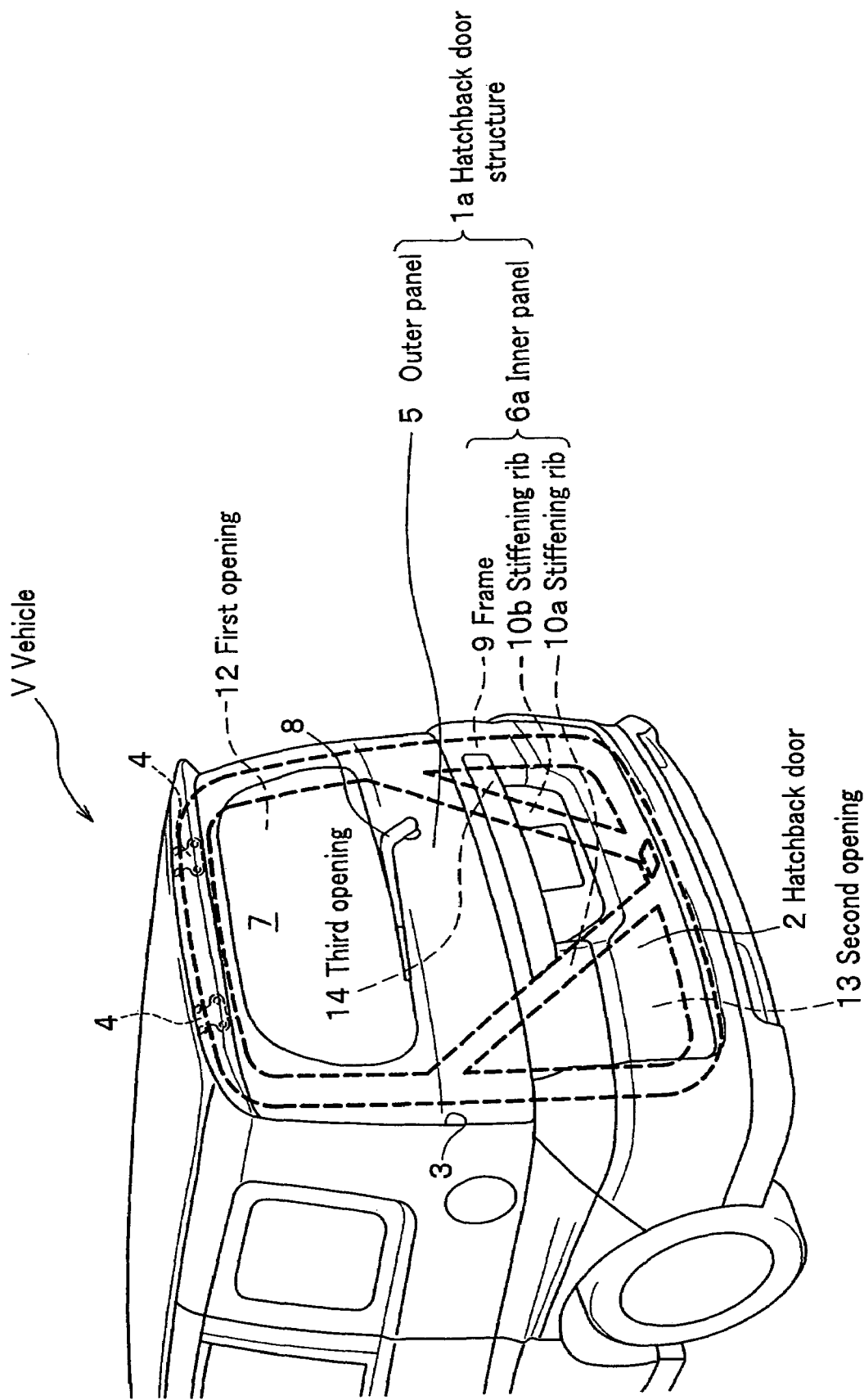
FIG. 1 is a partial perspective view of a vehicle to which a hatchback door structure according to a first embodiment of the present invention is applied.
Figure 2:
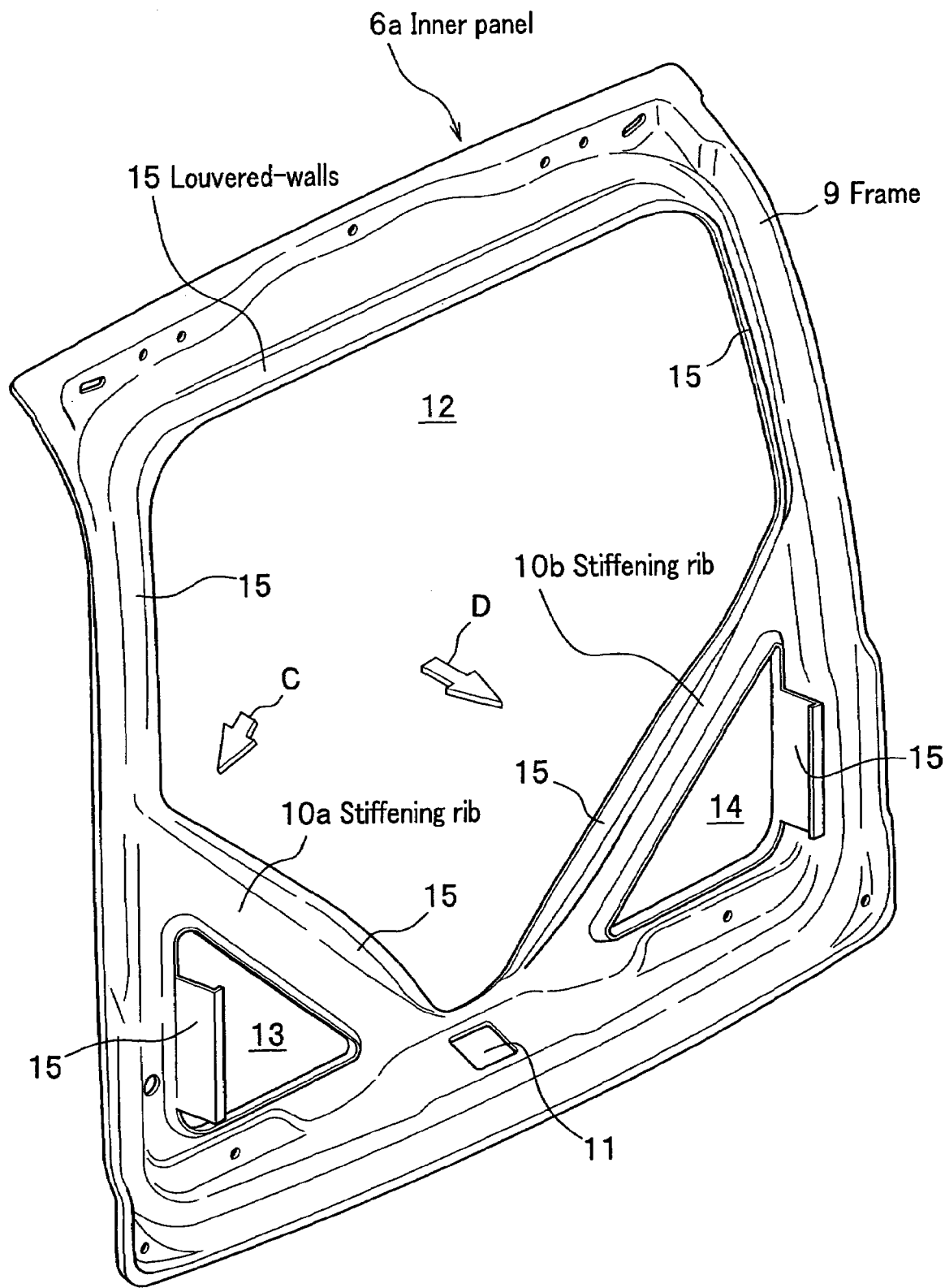
FIG. 2 is a perspective view showing an inner panel, seen from outside a vehicle, which configures a hatchback door structure according to the first embodiment.
Figure 3:
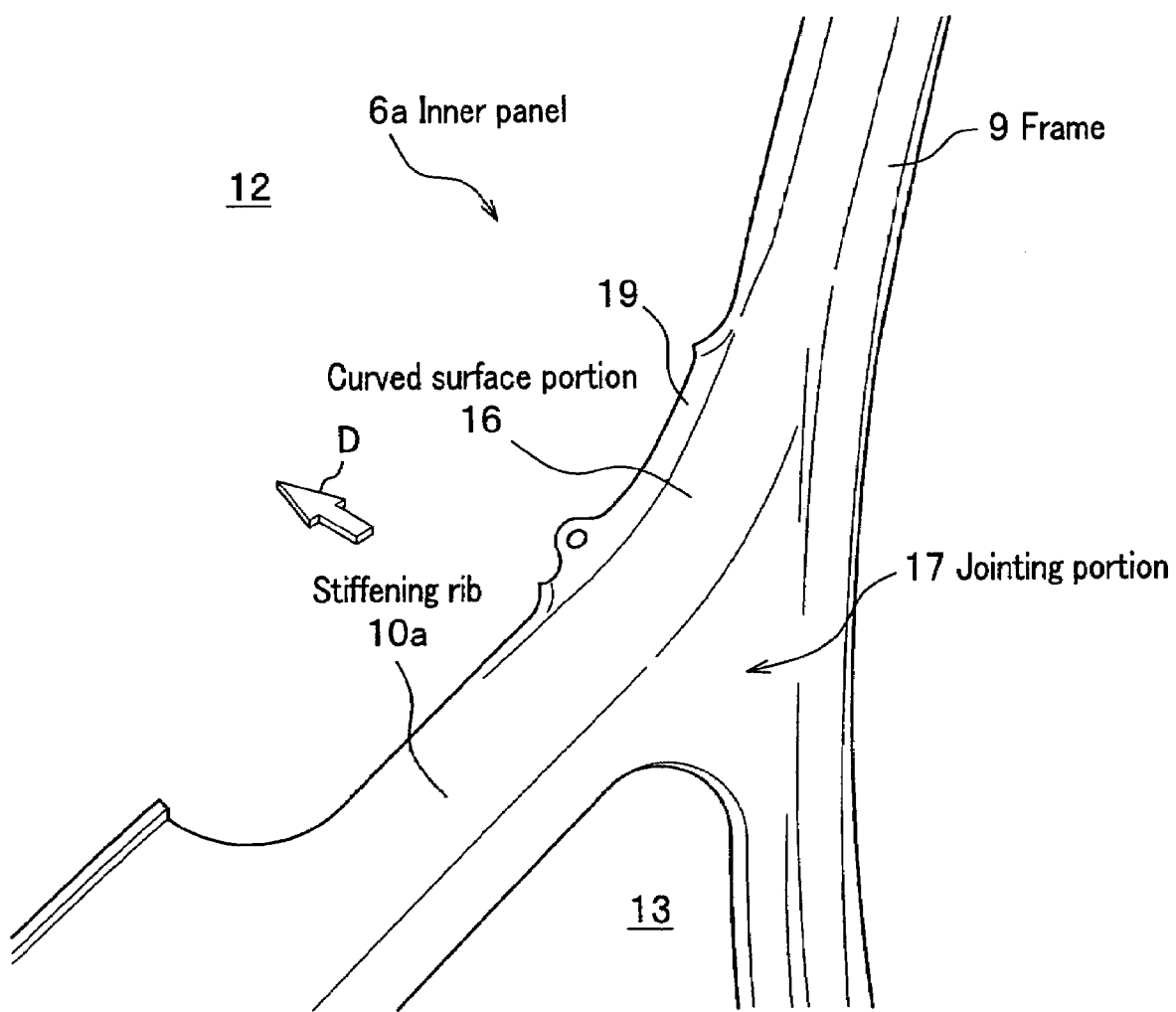
FIG. 3 is a partial perspective view showing a frame of an inner panel around a side and stiffening rib portions seen from inside a vehicle, that is, a portion indicated by an arrow C in FIG. 2.

Next, a hatchback door structure for vehicles according to a first embodiment will be explained in detail by referring to figures, as needed. FIG. 1 is a partial perspective view of a vehicle to which a hatchback door structure according to the first embodiment is applied. FIG. 2 is a perspective view showing an inner panel, seen from outside a vehicle, which configures a hatchback door structure according to the embodiment. FIG. 3 is a partial perspective view showing a frame of an inner panel around a side and stiffening rib portions seen from inside a vehicle, that is, a portion indicated by an arrow C in FIG. 2.

As shown in FIG. 1, a hatchback door structure 1a is applied to a hatchback door 2 for opening and closing a tailgate opening 3 of a vehicle V. The hatchback door 2 has a flip-up structure which rotates about hinges 4, 4 by jointing an upper periphery of the hatchback door 2 and an upper periphery of the tailgate opening 3 with a pair of the hinges 4, 4. In addition, at a center of a bottom portion of the hatchback door 2, a locking device (not shown) is disposed for locking the hatchback door 2 to a vehicle body at a closing position of the door.

The hatchback door structure 1a includes an outer panel 5 which is arranged on an outer side of the hatchback door 2 and forms an outer side surface of the vehicle V, and an inner panel 6a arranged on an inner side of the outer panel 5. The hatchback door 1a further includes a window 7 to be completed by fitting a glass in an upper portion of the hatchback door 2, and a wiper 8 arranged in a lower portion of the window 7.

As shown in FIG. 1, the inner panel 6a includes a frame 9 which outlines an outer shape of the hatchback door 2, and a pair of stiffening ribs 10a, 10b (hereinafter, referred to as "stiffening rib 10" when the stiffening ribs are not specified) which are integrally formed with the frame 9.

As shown in FIG. 2, the frame 9 according to the embodiment is formed by press-forming of a metal plate, and, in plane view, has an outer contour in approximately a rectangular shape, as well as an opening in approximately a rectangular shape inside the frame 9.

In addition, a locking device fixing portion 11 is disposed at a bottom center of the frame 9 for fixing the locking device (not shown).

As shown in FIG. 2, the stiffening ribs 10a, 10b extend in approximately a V-shape from the bottom of the frame 9, specifically extend from the locking device fixing portion 11 to both sides of the frame 9. Meanwhile, in the embodiment, the both sides of the frame 9 to which the stiffening ribs 10a, 10b are connected correspond to positions of both corners on a lower side of the window 7 (see FIG. 1).

Accordingly, by partitioning an opening formed inside the frame 9 with the stiffening ribs 10a, 10b, a first opening 12 is defined by upper sides of the stiffening ribs 10a, 10b and the frame 9, a second opening 13 is defined by a lower side of one stiffening rib 10a and the frame 9, and a third opening 14 is defined by a lower side of another stiffening rib 10b and the frame 9. Meanwhile, the first opening 12 according to the embodiment has a pentagonal shape and the second opening 13 and third opening 14 are triangular, in plane view.

As shown in FIG. 2, the inner panel 6a includes a plurality of cut-and-turned-up walls (hereinafter, referred to as louvered-walls) 15 on peripheries of the first opening 12, the second opening 13, and the third opening 14. The louvered-walls 15 are formed to turn up in a direction of the outer panel 5 (refer to FIG. 1), that is, in a direction D (refer to FIG. 2) toward outside a vehicle. In the first opening 12, the louvered-walls 15 are formed to turn up from the frame 9 and each stiffening rib 10a, 10b so as to surround the first opening 12. The louvered-walls 15 of the second opening 13 and third opening 14 are formed to turn up from the frame 9. Ends of the louvered-walls 15 are jointed to the outer panel 5 (refer to FIG. 1).

In addition, as shown in FIG. 3, the inner panel 6a has a curved surface portion 16 which is smoothly and continuously formed at a connection part of a side portion of the frame 9 and the stiffening rib 10a. The curved surface portion 16 corresponds to a "surface portion". Further, another smoothly continuous curved surface portion (not shown) is also formed at a connection part of a side portion of the frame 9 and the stiffening rib 10b shown in FIG. 2 in the same manner as the curved surface portion 16 in FIG. 3.

Meanwhile, the inner panel 6a of the hatchback door structure 1a according to the first embodiment is also used for a hatchback door structure 1b (refer to FIG. 4) according to a second embodiment, which will be described later. The inner panel 6a has a lateral beam fixing portion 19 on which a lateral beam 18 (refer to FIG. 4), which will be described later, is fixed. As shown in FIG. 3, the lateral beam fixing portion 19 is formed on a jointing portion 17 of the frame 9 and the stiffening rib 10, and specifically, it is formed to rise from a periphery on a side of the direction D (outer side of a vehicle) of the curved surface portion 16 to the first opening 12.

Next, effects and advantages of the hatchback door structure 1a according to the embodiment will be explained.

As described above, in the hatchback door structure 1a, since the inner panel 6a is formed so that the pair of the stiffening ribs 10a, 10b extend to the both sides in approximately a V-shape from the bottom side of the frame 9 which outlines the outer shape of the hatchback door 2, the first opening 12, the second opening 13, and the third opening 14 are formed in the inner panel 6a (refer to FIG. 1). That is, in the hatchback door structure 1a, a weight saving as well as increase in the rigidity is achieved by disposing an opening as large as possible on the inner panel 6a due to utilization of the frame 9 and the stiffening ribs 10a, 10b.

Figure 14:
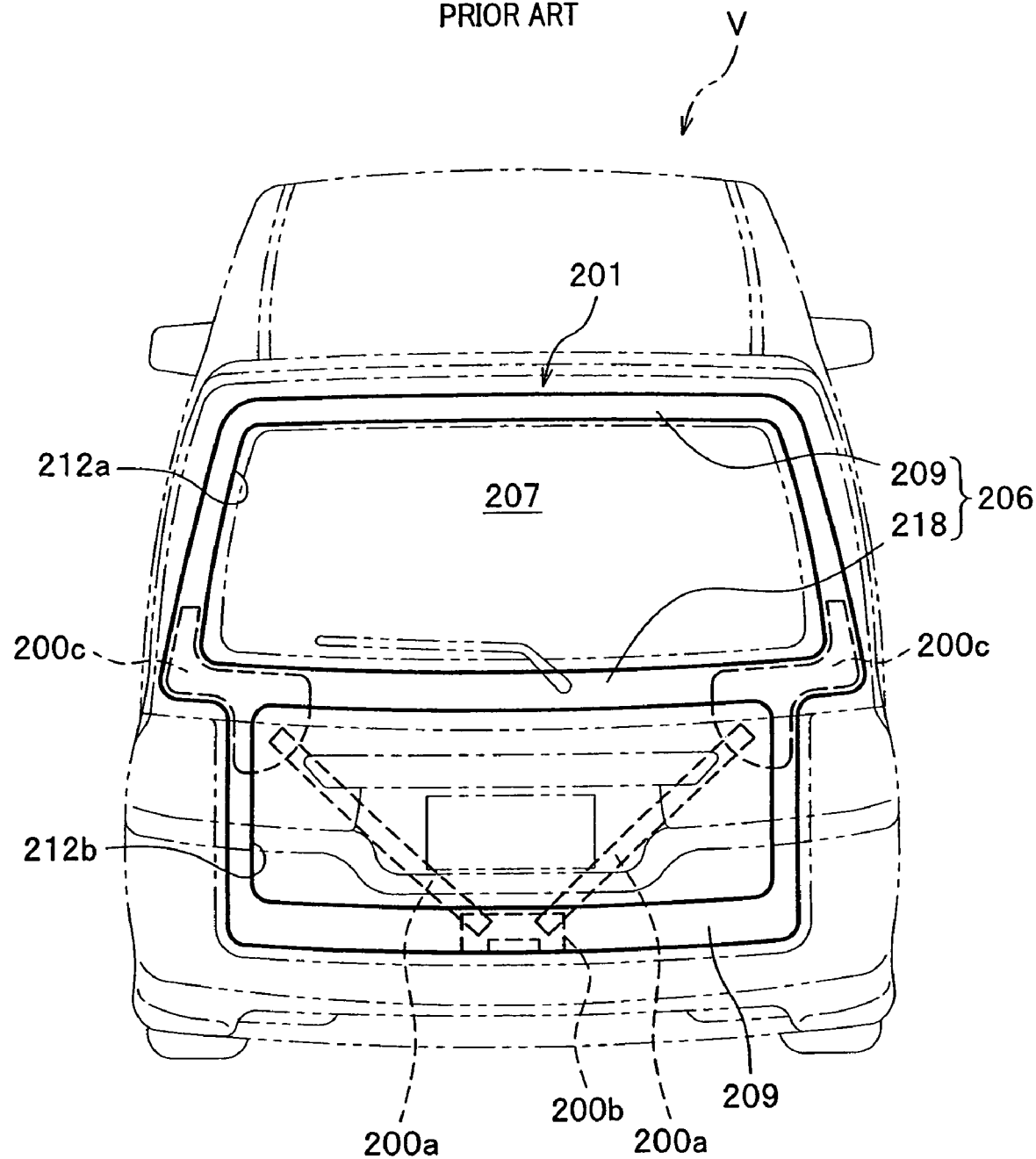
FIG. 14 is a schematic illustration of a vehicle, seen from behind the vehicle, for explaining a configuration of a conventional hatchback door structure.

In addition, in the hatchback door structure 1a, since the frame 9 and the stiffening ribs 10a, 10b are integrally formed by, for example, press-forming, a plurality of reinforcements become unnecessary in contrast with the conventional hatchback door 201 (refer to FIG. 14), thereby resulting in the weight reduction and manufacturing cost saving.

In addition, in the hatchback door structure 1a, since a plurality of the reinforcements are unnecessary in contrast with the conventional hatchback door 201 (refer to FIG. 14), a welding process becomes unnecessary, thereby resulting in reduction of the manufacturing process.

Further, in the hatchback door structure 1a, since there is not a bended portion where stresses tend to be converged and the curved surface portion 16 (refer to FIG. 3) is formed smoothly and continuously, the rigidity can be further increased.

Furthermore, in the hatchback door structure 1a, since the louvered-walls 15 formed on the peripheries of the first opening 12, the second opening 13, and the third opening 14 are jointed to the outer panel 5 (refer to FIG. 1), the rigidity can be further improved, while ensuring the weight saving by disposing an opening as large as possible on the inner panel 6a. In addition, since the louvered-walls 15 are turned up on the peripheries of the first opening 12, the second opening 13, and the third opening 14 in the hatchback door structure 1a, the louvered-walls 15 can be formed simultaneously with the formation of the first opening 12, the second opening 13, and the third opening 14, and can be formed easily in desired positions with optimal shapes.

Second Embodiment

Figure 4:
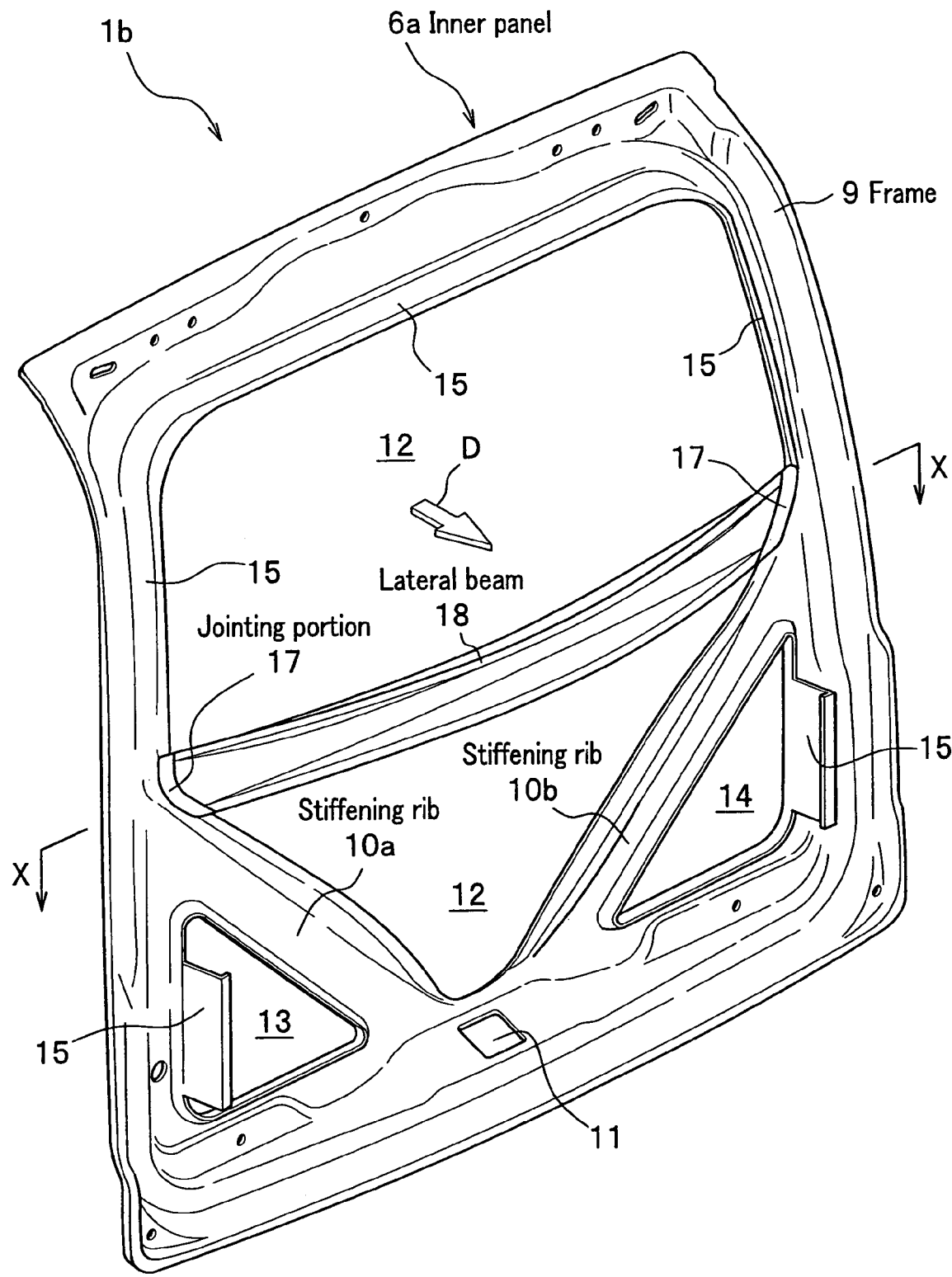
FIG. 4 is a perspective view showing an inner panel, seen from outside a vehicle, which configures a hatchback door structure according to a second embodiment of the present invention.

Next, a hatchback door structure for vehicles according to a second embodiment of the present invention will be explained in detail by referring to figures, as needed. FIG. 4 is a perspective view showing an inner panel, seen from outside a vehicle, which configures a hatchback door structure according to a second embodiment of the present invention.

Figure 5:
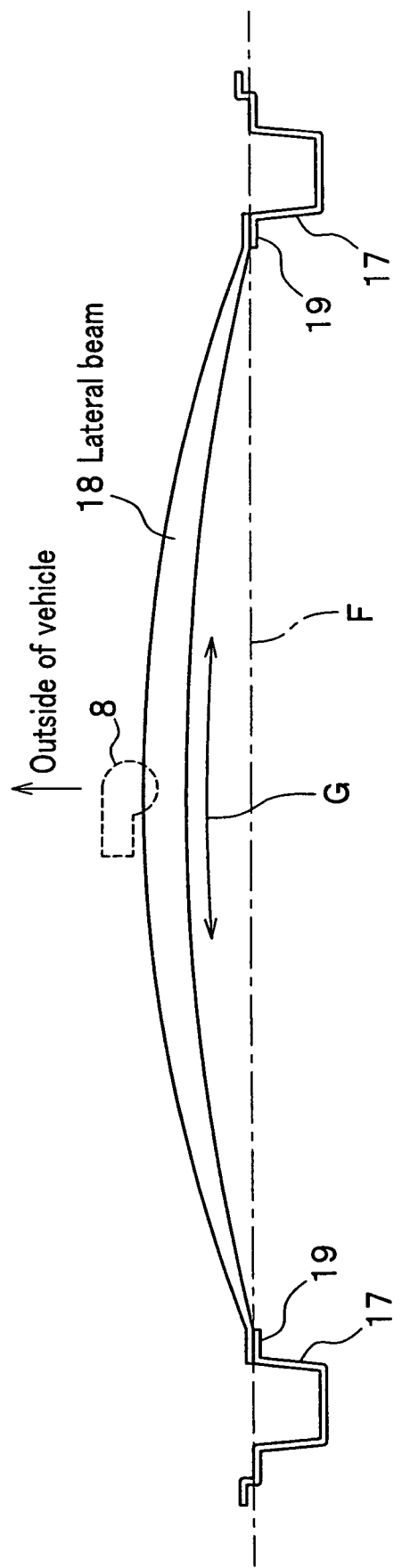
FIG. 5 is a cross sectional view taken along a line X-X of FIG. 4.
Figure 6:
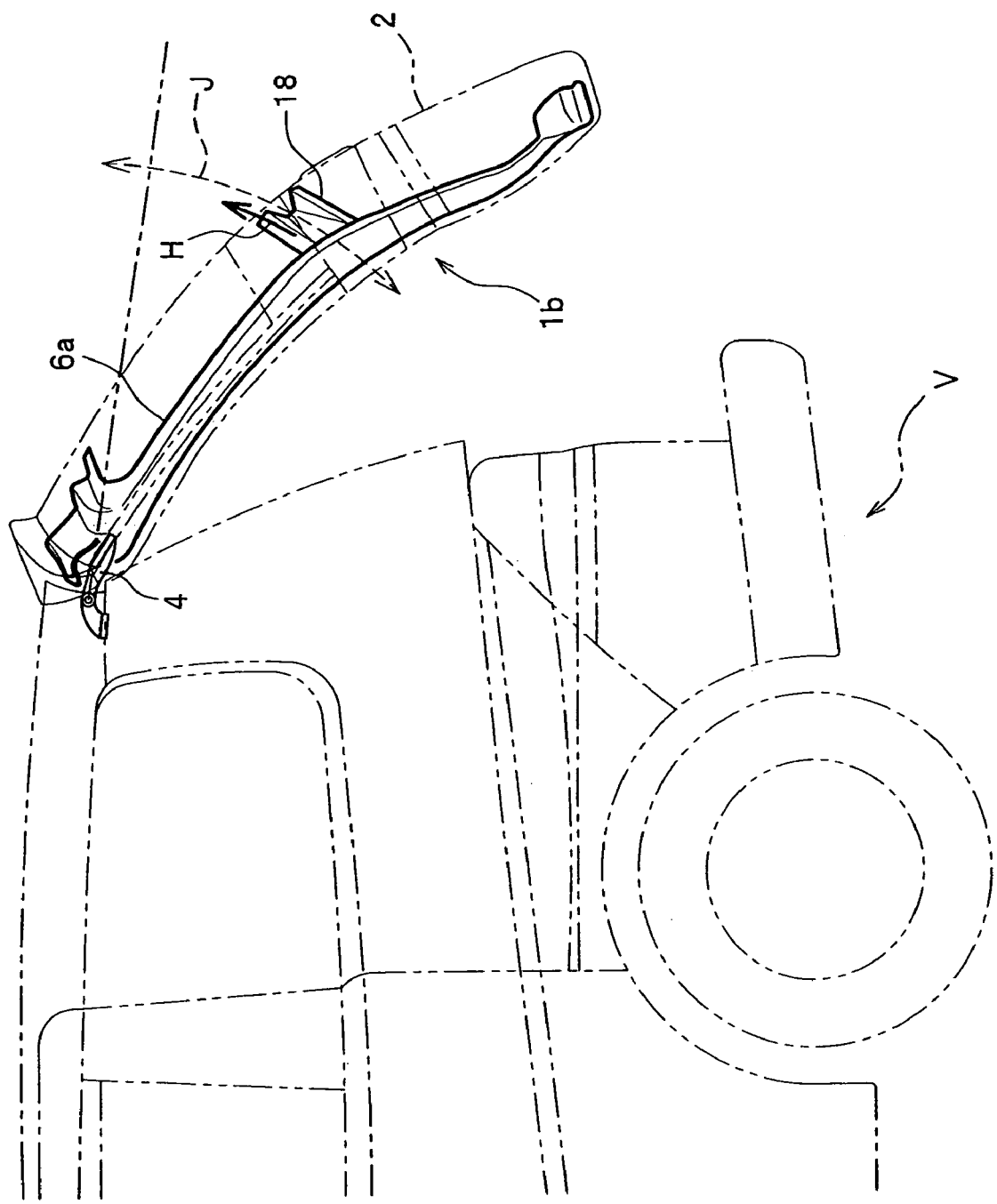
FIG. 6 is a side view of an inner panel according to the second embodiment.

FIG. 5 is a cross sectional view taken along a line X-X of FIG. 4. FIG. 6 is a side view of an inner panel according to the second embodiment. Meanwhile, FIG. 6 shows a state in which hinges are fixed on an inner panel. A vehicle to which the inner panel is applied is shown with a dashed-two dotted line. In the hatchback door structure according to the second embodiment, a configuration of the structure is identical to that of the first embodiment except for the presence of a lateral beam on the inner panel. Therefore, the inner panel will be mainly explained. A component identical to that of the first embodiment is labeled a same symbol, and the detailed explanation will be omitted.

As shown in FIG. 4, a lateral beam 18 is fixed on the inner panel 6a so that the lateral beam 18 extends between the jointing portions 17, 17 of side portions of the frame 9 and the stiffening ribs 10a, 10b. The lateral beam 18 is formed in a circular arch which is convex in a direction D directed to outside a vehicle, that is, formed in a curved shape outlining an outer surface (outer surface of the outer panel 5, refer to FIG. 1) of the hatchback door 2 (refer to FIG. 2). The lateral beam 18 is a discrete member which is different from the frame 9 and the stiffening ribs 10a, 10b. Each end of the lateral beam 18 is fixed on the lateral beam fixing portions 19 (refer to FIG. 3) by, for example, spot welding. In this case, the lateral beam 18 is fixed on the lateral beam fixing portions 19 from outside a vehicle. Meanwhile, the lateral beam 18 may also be fixed from inside a vehicle. As shown in FIG. 5, in the lateral beam 18 according to the embodiment, a size of a cross section of the lateral beam 18 gradually becomes larger from both ends to a center portion. That is, a thickness of the lateral beam 18 in a direction protruded outside a vehicle gradually becomes thicker as a position of the cross section approaches the center portion from the both ends (gradually becomes thinner from the center portion to the both ends). A heavy object such as a motor (not shown) of the wiper 8 may be mounted on the center portion of the lateral beam 18. Each of the lateral beam fixing portions 19, 19 on the jointing portions 17, 17 is disposed on a same plane F which is defined in a width direction of a vehicle.

In addition, as shown in FIG. 6, the lateral beam 18 is arranged so that a protruding direction H, which is approximately perpendicular to an extending direction G (refer to FIG. 5) of the lateral beam 18, is directed along an opening-closing direction J of the hatchback door 2.

Next, effects and advantages of the hatchback door structure 1b according to the embodiment will be explained.

In the hatchback door structure 1b, the press-forming of the inner panel 6a can be easily performed by forming the lateral beam 18 as a discrete member which is different from the frame 9 and the stiffening ribs 10a, 10b. In addition, a larger opening (first opening 12) can be achieved due to the increase in the level of freedom of the press-forming.

In the hatchback door structure 1b, the lateral beam 18 is curved in a circular arch, and the size of the cross section gradually increases from each of the ends to the center portion (see FIG. 5). Therefore, even if a large stress is applied to the center portion of the lateral beam 18 by fixing a heavy object such as a motor (not shown) of the wiper 8, the lateral beam 18 can support the stress due to the rigidity. In other words, since the size of the cross section of the lateral beam 18 gradually decreases as a position of the cross section approaches each of the ends from the center portion, weight reduction of the lateral beam 18 also can be achieved.

In addition, in the hatchback door structure 1b, since the lateral beam 18 is arranged so that the protruding direction H (refer to FIG. 6), which is approximately perpendicular to the extending direction G of the lateral beam 18, is directed along the opening-closing direction J of the hatchback door 2, the lateral beam 18 can sufficiently support a load applied thereon, especially when the hatchback door 2 is closed.

Further, in the hatchback door structure 1b, each of the lateral beam fixing portions 19, 19 (refer to FIG. 5) of the lateral beam 18 is disposed on the same plane F which is defined in the width direction of a vehicle. Therefore, the lateral beam 18 can equally transfer a load applied thereon to each of the lateral beam fixing portions 19, 19 when the hatchback door 2 is closed. As a result, the load applied to the lateral beam fixing portions 19, 19 can be equally dispersed. In addition, in the hatchback door structure 1b, since the lateral beam 18 is fixed on the same plane F, the positioning of the lateral beam 18 relative to the jointing portion 17 becomes easier, thereby resulting in improvement of fixing workability of the lateral beam 18.

Meanwhile, the present invention is not limited to the aforementioned embodiments, but can be embodied in various modifications. In the first and second embodiments, the louvered-walls 15 of the inner panel 6a are formed on the peripheries of all openings: the first opening 12, the second opening 13, and the third opening 14. However, the louvered-walls 15 may be formed on the peripheries of at least one of these openings.

In addition, in the second embodiment, the lateral beam 18 is fixed on the inner panel 6a as a discrete member. However, the present invention is not limited to this. Here, FIG. 7 is a perspective view of an inner panel, seen from outside a vehicle, which configures a hatchback door structure according to another embodiment of the present invention.

Figure 7:
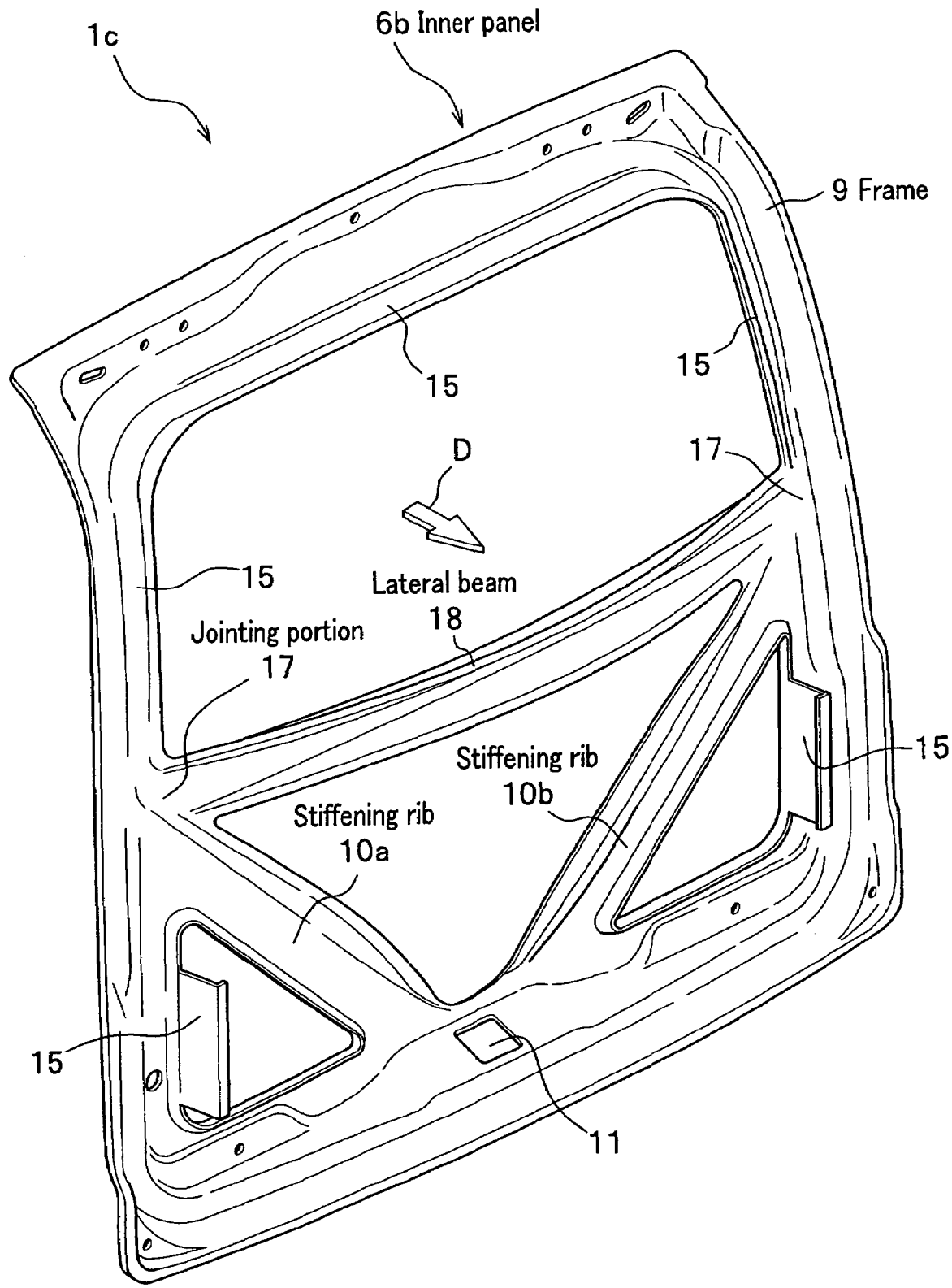
FIG. 7 is a perspective view of an inner panel, seen from outside a vehicle, which configures a hatchback door structure according to another embodiment of the present invention.

As shown in FIG. 7, in an inner panel 6b which configures a hatchback door structure 1c, the lateral beam 18 extending between the jointing portions 17, 17 is integrally formed with the inner panel 6b by press-forming.

In the hatchback door structure 1c, since the lateral beam 18 is integrally formed with the frame 9 and the stiffening ribs 10 (10a, 10b), the manufacturing process of the hatchback door structure 1c (inner panel 6b) can be simplified, and at the same time, the rigidity can be increased.

In addition, in the aforementioned embodiments, the stiffening ribs 10a, 10b extend approximately straight. However, the stiffening ribs 10a, 10b may extend with a curvature within a range not to undermine the purposes of the present invention.

Third Embodiment

Next, a hatchback door structure for vehicles according to a third embodiment of the present invention will be explained in detail by referring to figures, as needed.

Figure 8:
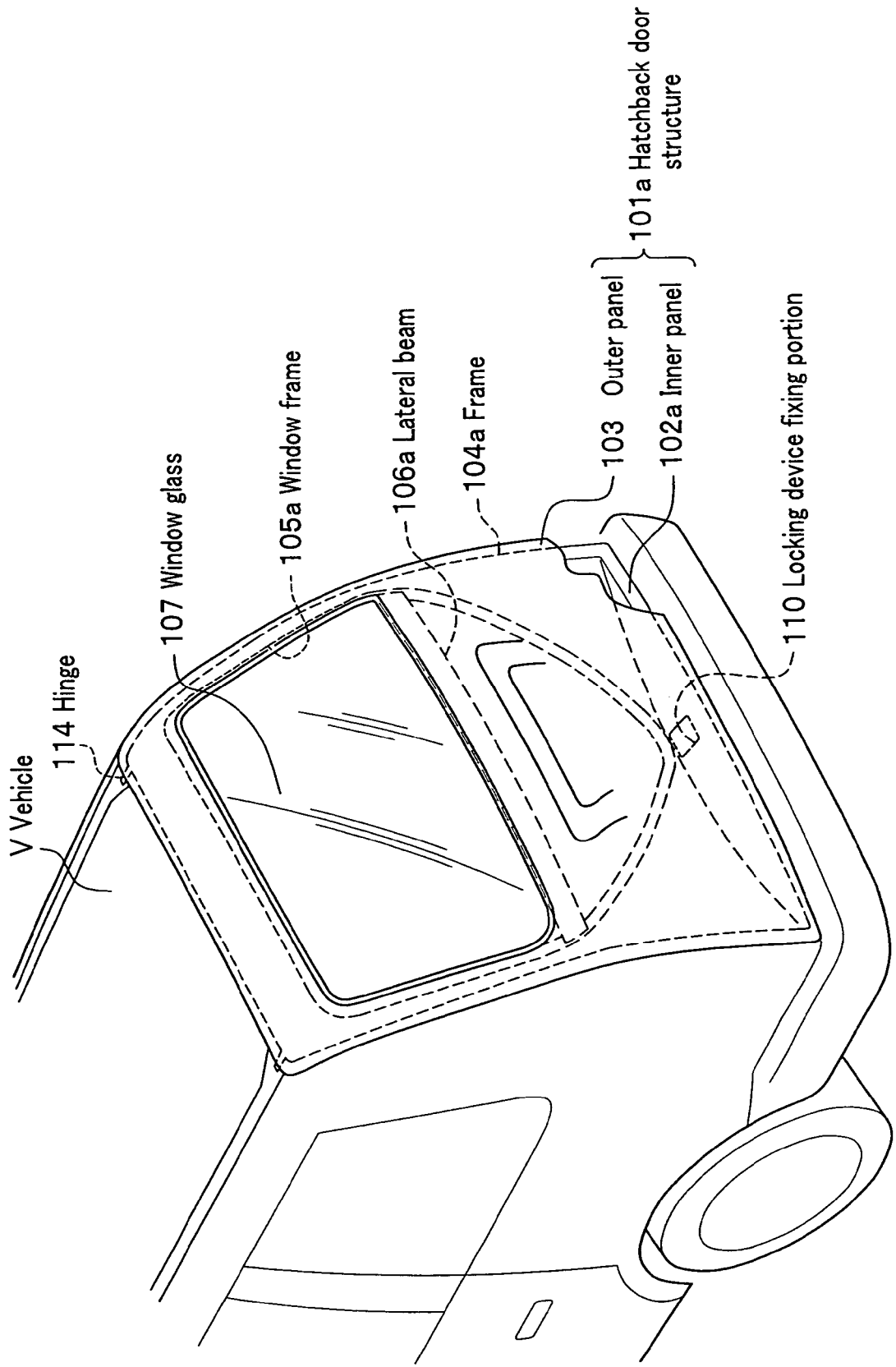
FIG. 8 is a schematic view of a vehicle, seen from behind the vehicle, to which a hatchback door structure according to a third embodiment of the present invention is applied.

FIG. 8 is a schematic view of a vehicle, seen from behind the vehicle, to which a hatchback door structure according to the third embodiment of the present invention is applied. A hatchback door structure 101a according to the third embodiment is configured with an inner panel 102a and an outer panel 103. The hatchback door structure 101a is applied to a vehicle V with hinges 114. The inner panel 102a and the outer panel 103 are assembled by a hemming process or spot-welding and the like. In the inner panel 102a, a frame 104a which outlines the hatchback door structure 101a along its outer shape is formed. In the frame 104a, a window frame 105a on which a glass window 107 is fixed is formed, and a lateral beam 106a is fixed on the frame 104a. At a bottom of the frame 104a, a locking device fixing portion 110 is formed.

Figure 9:
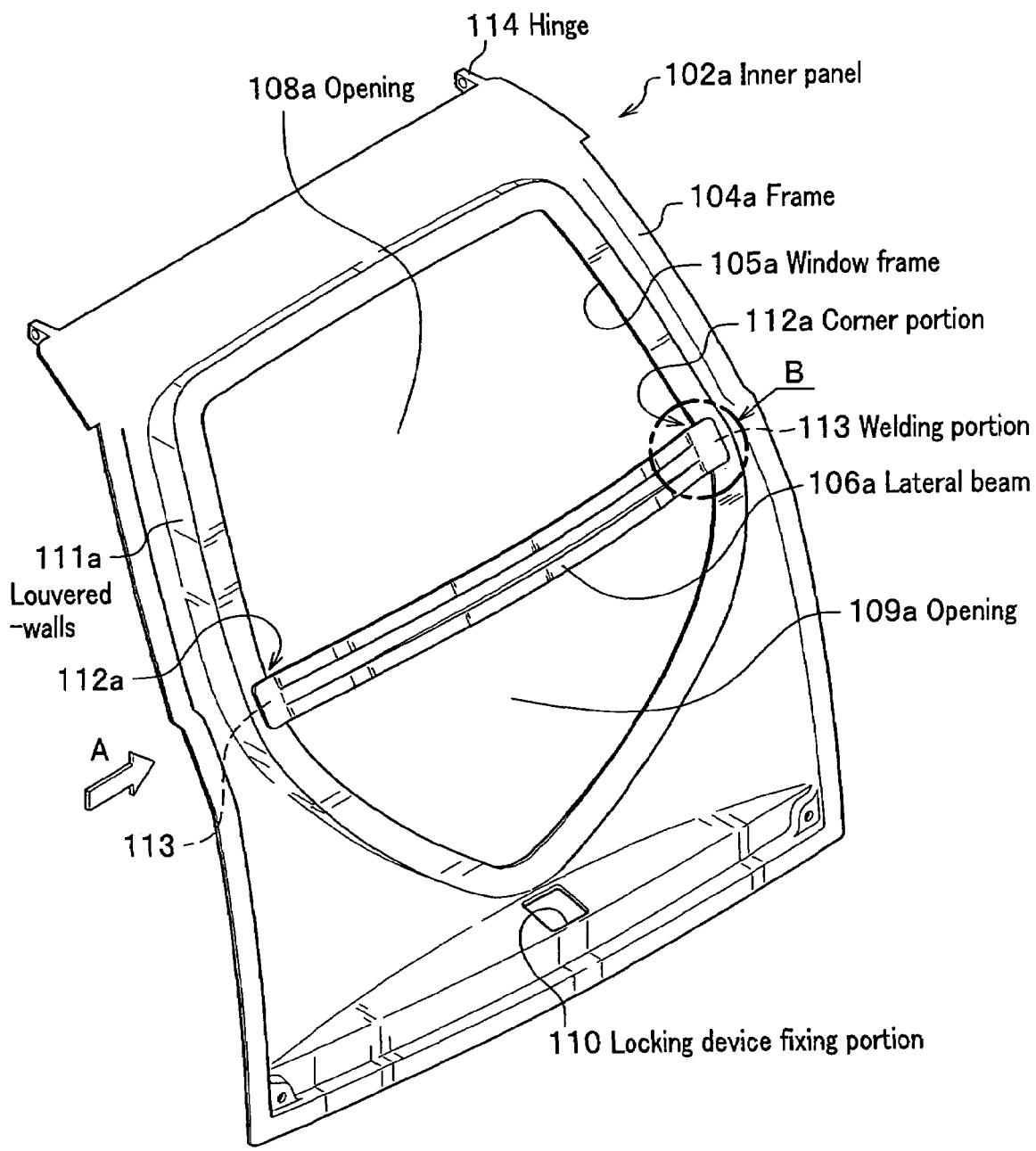
FIG. 9 is a perspective view of an inner panel which is used for a hatchback door structure according to the third embodiment.

FIG. 9 is a perspective view of an inner panel which is used for a hatchback door structure according to the third embodiment. In an upper portion of the frame 104a configuring the inner panel 102a, the window frame 105a is formed. The frame 104a is formed by press-forming. On a pair of welding portions 113, 113 on a window frame 105a, which are located at a bottom of the window frame 105a, a discrete lateral beam 106a is fixed from outside a vehicle by spot welding. Therefore, the lateral beam 106a is fixed between the pair of the welding portions 113, 113 across an opening. Meanwhile, in the embodiment, the lateral beam 106a is fixed from outside a vehicle so that strength of the hatchback door against an impact at closing the hatchback door is increased. However, the lateral beam 106a may be fixed on the welding portions 113, 113 of the window frame 105a from inside a vehicle.

On an upper side of the lateral beam 106a, an opening 108a in which a glass window is fixed is disposed. In addition, on a lower side of the lateral beam 106a, an opening 109a is disposed. On peripheries of these openings 108a, 109a, cut-and-turned-up walls (hereinafter referred to as louvered-walls) 111a are formed. The louvered-walls 111a have the effect of increasing the rigidity of the inner panel 102a against bending.

Figure 10A:
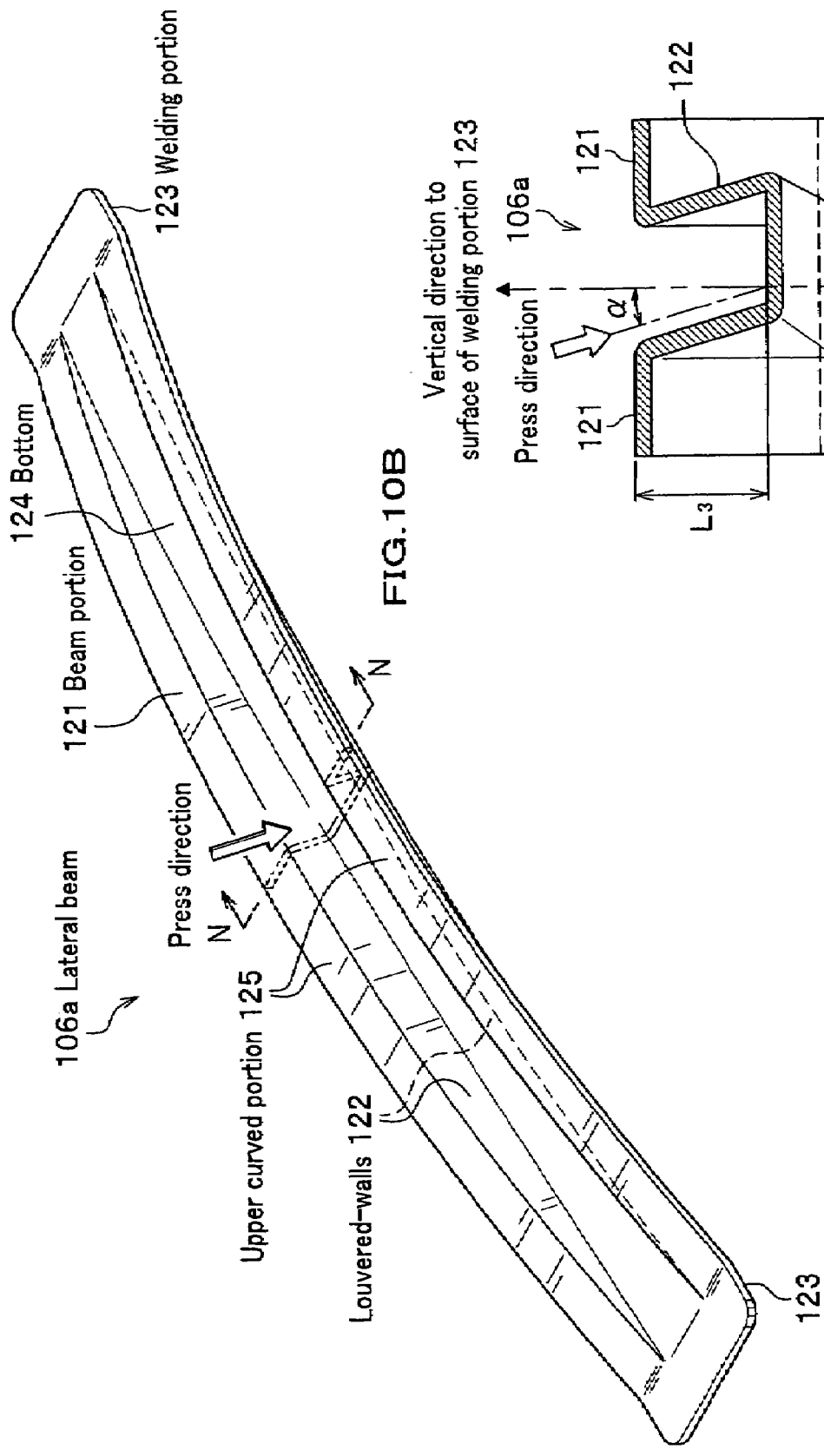
FIG. 10A is a perspective view of a discrete lateral beam according to the third embodiment.
Figure 10B:
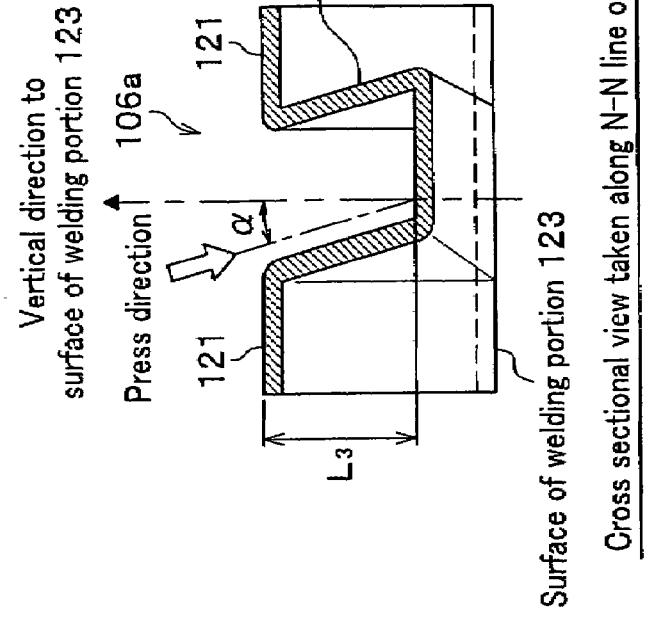
FIG. 10B is a cross sectional view of the discrete lateral beam according to the third embodiment, taken along a line N-N at a center portion of the beam.

FIG. 10A is a perspective view of a discrete lateral beam 106a which is used for the third embodiment. FIG. 10B is a cross sectional view of the lateral beam 106a used for the embodiment, taken along a line N-N at the center portion of the lateral beam 106a. The lateral beam 106a is a member formed by press-forming as a discrete member which is different from the frame 104a of the inner panel 102a (refer to FIG. 8 and FIG. 9). The lateral beam 106a has a pair of welding portions 123, 123 on both ends. The pair of welding portions 123, 123 is on a same plane and spot-welded on the window frame 105a which is formed on the frame 104a which configures the inner panel 102a (refer to FIG. 9).

A portion between the pair of welding portions 123, 123 is a beam portion 121. In the beam portion 121, a pair of louvered-walls 122 is formed. The louvered-walls 122 are provided to increase the rigidity of the inner panel 102a against a lateral bending.

The louvered-walls 122 become higher from each end of the beam portion 121 to a center portion. The louvered-walls 122 have the maximum height L3 at a center of the beam portion 121. Thus, the lateral beam 106a is formed in an arch in which a size of a cross section of the lateral beam 106a becomes maximum at the center and minimum at the both ends of the beam portion 121. By forming the lateral beam 106a as described above, a bending stress applied to the lateral beam 106a becomes uniform within the lateral beam 106a.

Figure 15:
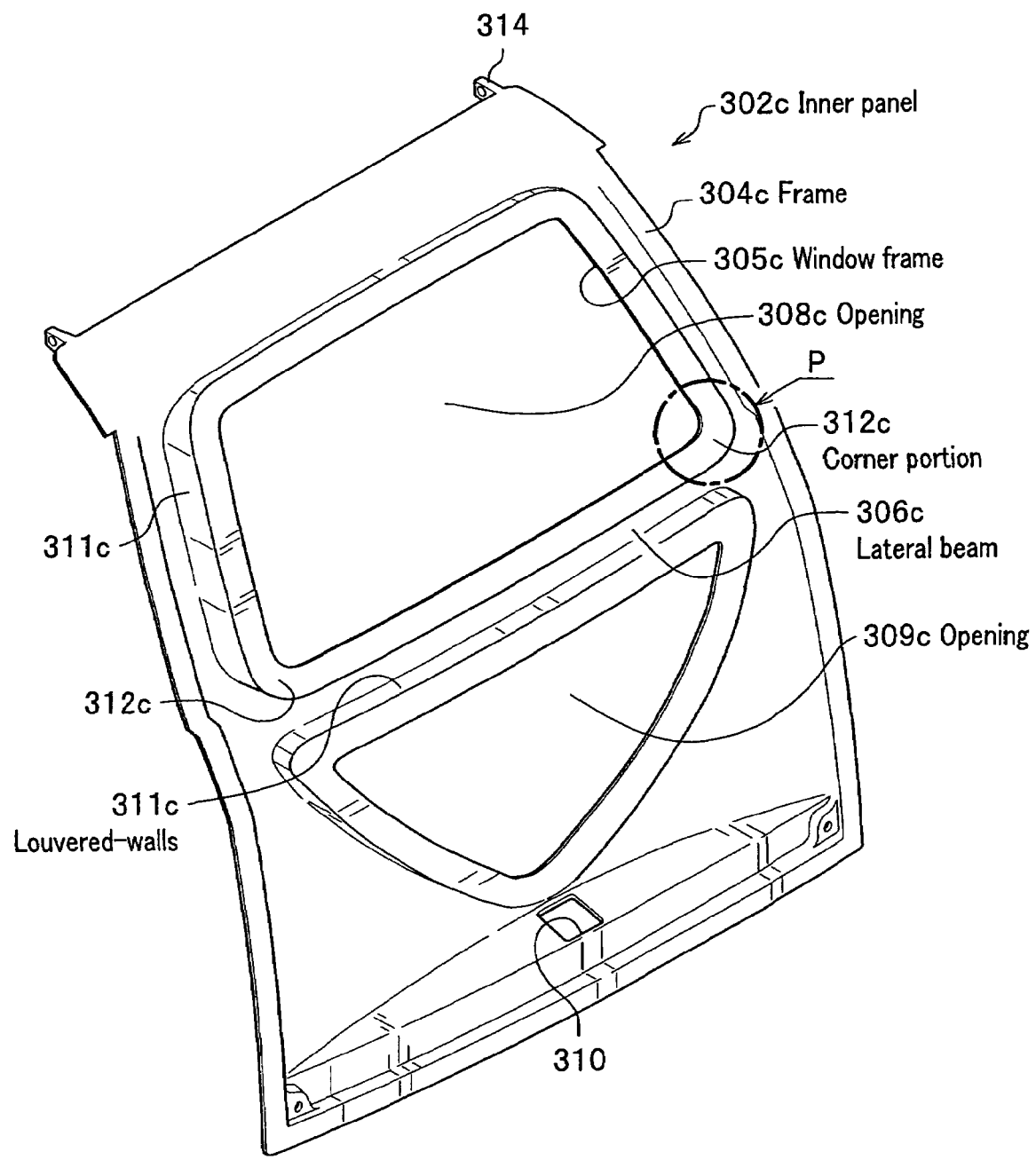
FIG. 15 is a perspective view showing an example of an inner panel which corresponds to a conventional hatchback door structure.

In addition, since the lateral beam 106a is formed as a discrete member different from the frame 104a, a level of freedom of the shape design becomes higher than that of the conventional lateral beam 306c (refer to FIG. 15). For example, it is easy to make the maximum height L3 of the louvered-walls 122 of the lateral beam 106a higher than that of the louvered-walls 311c of the conventional lateral beam 306c. In addition, if the louvered-walls 122 are made higher, a rigidity of the lateral beam 106a against a bending can be maintained, even if the lateral beam 106a is formed using a thinner panel material than that of the frame 104a by press-forming.

Further, the lateral beam 106a has a superior press formability since it is formed as a discrete member by press-forming. Therefore, a formation of holes for weight saving on a bottom 124 and an upper curved portion 125 of the beam portion 121 can be performed relatively easily. A hole for fixing, for example, a motor of a wiper may be formed on the upper curved portion 125 of the lateral beam 106a in some case, and any portion of the upper curved portion 125 can be used to form the hole because of the excellent press formability. For example, for a motor of a wiper or the like fixed on the lateral beam 106a, a fixing weld-nut or the like can be welded in advance on the upper curved portion 125 of the lateral beam 106a.

In the lateral beam 106a of the inner panel 102a which is used for the hatchback door structure 101a (refer to FIG. 8) according to the embodiment, when the lateral beam 106a is formed, a direction of press-forming (hereinafter, referred to as press direction) forms a constant angle α with a direction perpendicular to a surface of a pair of the welding portions 123, 123. As shown in FIG. 10B, the press direction of the lateral beam 106a makes the angle α with a vertical direction to the surface of the welding portions 123, 123. Therefore, surfaces of the louvered-walls 122 which are formed by the press-forming are not perpendicular to the surface of the pair of the welding portions 123, 123. When the hatchback door structure 101a including the inner panel 102a is fitted up on the vehicle V, the hatchback door structure 101a rotates about the hinges 114 which connect the hatchback door structure 101a to the vehicle V. The press direction is determined to form the angle α with the vertical direction of the surface of the pair of the welding portions 123, 123 so that the surfaces of the louvered-walls 122 become in parallel with a tangential direction of a rotation circle of the hatchback door.

Figure 11:
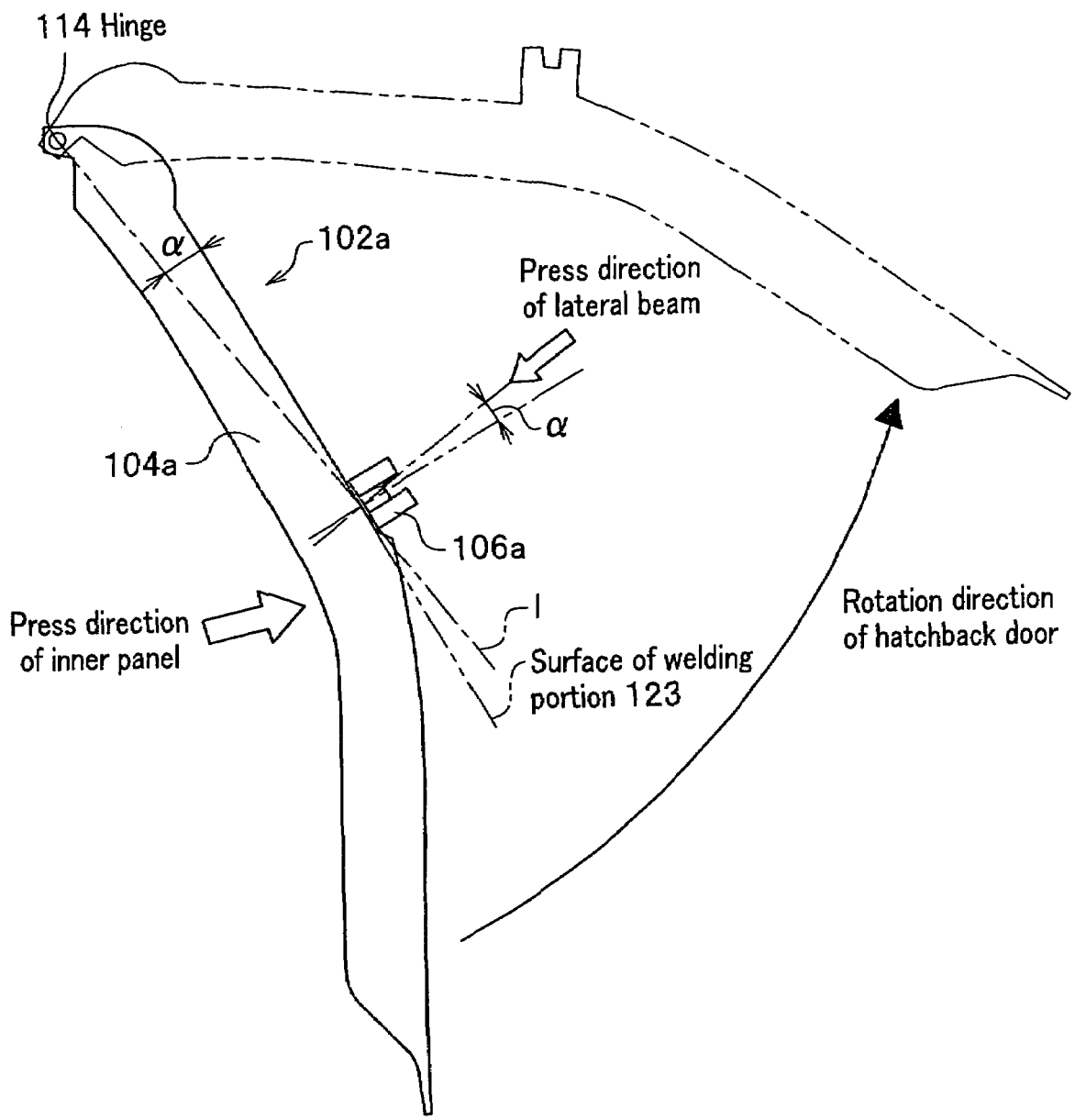
FIG. 11 is a side view of an inner panel, seen from a direction indicated by an arrow A in FIG. 9, which is used for the third embodiment.

FIG. 11 is a side view of an inner panel 102a, seen from a direction of an arrow A in FIG. 9, to be used for the third embodiment. The angle α between the press direction of the lateral beam 106a shown in FIG. 10B and the vertical direction to the surface of the pair of welding portions 123, 123 corresponds to an angle which is formed between the surface of the pair of welding portions 123, 123 and a line I which connects the center of the lateral beam 106a and the center between the two hinges 114. Due to the above, the press direction of the lateral beam 106a is in parallel with the tangential direction of the rotation circle of the hatchback door about the hinges 114 of the inner panel 102a.

When the hatchback door is closed, the hatchback door structure 101a (refer to FIG. 8) receives a force in the tangential direction of the rotation circle. As a result, vibrations are generated in the hatchback door structure 101a. However, as described above, the vibrations can be effectively suppressed due to the relatively high rigidity of the louvered-walls 122 which is obtained by making the press direction of the lateral beam 106a in parallel with the tangential direction of the rotation circle of the hatchback door structure 101a.

In a conventional inner panel 302c shown in FIG. 15, since a lateral beam 306c is integrally formed with a frame 304c, press directions of the frame 304c and the lateral beam 306c are always same. However, a press direction of the lateral beam 106a according to the embodiment is not matched with that of the inner panel 102a (refer to FIG. 1). In the present invention, since the lateral beam 106a is formed as a discrete member which is different from the inner panel 102a, a press direction of each member can be determined independently.

Since the lateral beam 106a is a discrete member different from the frame 104a of the inner panel 102a, a panel thickness of the lateral beam 106a may be different from that of the frame 104a for the weight saving as described above. In addition, a material of the lateral beam 106a may be different from that of the frame 104a.

An explanation of corner portions 112a, 112a (refer to FIG. 9) formed by welding of the lateral beam 106a and the window frame 105a of the inner panel 102a are welded will be made by comparing with corner portions 312c, 312c of the conventional inner panel 302c shown in FIG. 15. FIG. 12A is an enlarged view of a portion B in FIG. 9 in which a lateral beam of an inner panel according to the embodiment is welded to the frame 104a. FIG. 12B is an enlarged view of a portion P in FIG. 15 in which a lateral beam of an inner panel of a comparative example is integrally formed with a frame 304c. As shown in FIG. 12A, in the inner panel 102a according to the embodiment, the lateral beam 106a is welded on the window frame 105a at approximately right angle. On the other hand, in the inner panel 302c of the comparative example shown in FIG. 12B, since a lateral beam 306c is integrally formed with a window frame 305c, the corner portions 312c, 312c are required to have a radius R larger than a predetermined value for ensuring a press formability. As a result, an opening 308c for a glass window of the inner panel 302c becomes smaller than the opening 108a of the inner panel 102a according to the embodiment.

In the inner panel 102a which is used for the hatchback door structure 101a according to the embodiment, since the lateral beam 106a is formed as a discrete member, a height L1 (refer to FIG. 12A and FIG. 9) of the louvered-walls 111a of the inner panel 102a can be determined independently of the maximum height L3 of the louvered-walls 122 (refer to FIG. 10B) of the lateral beam 106a. On the other hand, in the case of the comparative example (refer to FIG. 12B and FIG. 15), since the lateral beam 306c is integrally formed, there is a limitation on the press formability. As a result, a height L2 of the louvered-walls 311c of the frame 304c and the lateral beam 306c is limited by the press-forming, thereby resulting in a certain limited height Lc (not shown) or less.

In the inner panel 102a, since the lateral beam 106a is formed as a discrete member different from the frame 104a, the press formability is superior to that of the conventional inner panel 302c. Therefore, the height L1 of the louvered-walls 111a can easily be made higher than the limited height Lc of the louvered-walls 311c. Therefore, by increasing the height L1 of the louvered-walls 111a as needed, that is, by increasing a cross sectional width in an inside-outside direction of the hatch back door structure 101a, the rigidity of the frame 104a which configures the inner panel 102a can be increased.

Next, effects and advantages of the hatchback door structure 101a according to the embodiment will be explained based on the configuration of the hatchback door structure 101a.

In the hatchback door structure 101a according to the embodiment, a press direction of the lateral beam 106a of the inner panel 102a can be determined independently from that of the inner panel 102a. As a result, as described above, by selecting the press direction of the lateral beam 106a, the vibrations of the hatchback door at closing the door can be suppressed effectively, compared with the conventional hatchback door.

In the inner panel 102a to be used for the hatchback door structure 101a according to the embodiment, since the lateral beam 106a is fixed as a discrete member, the press formability of the inner panel 102a is improved, compared with the conventional example. As a result, the height of the louvered-walls 111a of the frame 104a of the inner panel 102a can be made higher than that of the louvered-walls 311c of the conventional inner panel 302c. Accordingly, the rigidity of the inner panel 102a can be increased.

In the inner panel 102a to be used for the hatchback door structure 101a according to the embodiment, as shown in FIG. 12A, the lateral beam 106a is fixed on the window frame 105a of the frame 104a at approximately right angle. As a result, a rearward visibility can be improved due to increase in the opening 108a for a glass window, compared with the conventional example in which the lateral beam 306c shown in FIG. 15 is integrally formed with the window frame 305c of the frame 304c.

In the inner panel 102a to be used for the hatchback door structure 101a according to the embodiment, since the lateral beam 106a is formed as a discrete member different from the frame 104a (refer to FIG. 9), the rigidity of the inner panel 102a can be effectively increased by modifying a shape of the lateral beam 106a. In addition, by increasing or decreasing a plate thickness of the lateral beam 106a as needed, the weight saving or rigidity improvement of the inner panel 102a can be achieved. Further, a material of the lateral beam 106a can be different from that of the frame 104a. For example, aluminum alloy can be employed as a material of the lateral beam 106a for the weight saving.

In addition, since the lateral beam 106a is formed as a discrete member different from the frame 104a, an amount of a panel material punched out by the press-forming from a window portion of the frame 104a becomes fairly large. Therefore, the panel material punched out by the press forming can be utilized for manufacturing other components.

In the hatchback door structure 101a according to the third embodiment, a small component such as a nut can be assembled in advance on the discrete lateral beam 106a. For example, a weld-nut for fixing a motor of a wiper can be welded in advance on the lateral beam 106a. Through the above, a number of component to be welded on the panel can be reduced, thereby resulting in simplification of the welding process.

The present invention is not limited to the aforementioned embodiment. Modifications of each figuration requirement of the embodiment are possible without departing from the spirits of the present invention. For example, it is unnecessary that a press direction of the lateral beam 106a in FIG. 11 is accurately in parallel with the tangential direction of the rotation circle of the hatch back door. Further, the following modification of the frame 104a of the inner panel 102a is also included in the present invention.

FIG. 13 is a perspective view of an inner panel reinforced by a V-shaped stiffening rib frame which is used for another embodiment of the present invention. In the embodiment, an upper portion of the fame 104b of the inner panel 102b is the same with the frame 104a of the inner panel 102a in FIG. 9. However, a V-shaped stiffening rib frame 115 is disposed from both bottom corners of the window frame 105b formed on the frame 104b to a locking device fixing portion 110, and openings 116a, 116b are formed on both sides of the V-shaped stiffening rib frame 115.

In a hatchback door structure which uses the inner panel 102b shown in FIG. 13, a press formability of the frame 104b is excellent due to utilization of a discrete lateral beam 106b. Therefore, the inner panel 102b reinforced by the V-shaped stiffening rib frame 115, which has higher louvered-walls 111b, has a satisfactory rigidity. Then, a hatchback door structure using the inner panel 102b shown in FIG. 13 has all advantages of the hatchback door structure 101a described above. In addition, the hatchback door structure is effective for the weight saving of the structure due to the openings 116a, 116b.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A hatchback door structure for vehicles, comprising:
an inner panel which is arranged on an inner side of a vehicle; and
an outer panel which is arranged on an outer side of the vehicle;
wherein the inner panel is formed as an integral unitary member by press-forming; and
wherein the inner panel comprises:
a frame which has a shape outlining an outer shape of the hatchback door structure, hinges provided on an upper periphery of the frame for attaching the hatchback door structure to a vehicle, and
a pair of stiffening ribs which are integrally formed with the frame, said stiffening ribs extending approximately in a V-shape from a bottom part of the frame to each of a couple of side portions of the frame, wherein:
on an upper side of the stiffening ribs, a substantially pentagonal first opening is defined by the stiffening ribs and the frame;
on a lower side of one of the stiffening ribs, a substantially triangular second opening is defined by the one of the stiffening ribs and the frame; and
on a lower side of the other stiffening rib, a substantially triangular third opening is defined by the other stiffening rib and the frame.

2. The hatchback door structure for vehicles according to claim 1, wherein a smoothly continuous surface portion is integrally formed with the inner panel at a connection part between a side portion of the frame and the stiffening rib.

3. The hatchback door structure for vehicles according to claim 1, wherein the pair of the stiffening ribs extends approximately in a V-shape from a locking device fixing portion which is formed on the bottom part of the frame to each of the couple of side portions of the frame, the locking device fixing portion being configured for fixing a locking device.

4. The hatchback door structure for vehicles according to claim 1, wherein the inner panel has cut-and-turned-up walls which are integrally formed with the inner panel, protrude outward to an outer panel side, and are jointed to the outer panel.

5. The hatchback door structure for vehicles according to claim 1, wherein the inner panel further comprises a lateral beam which extends between jointing portions on each of which are jointed the side portion of the frame and the stiffening rib, and is integrally formed with the inner panel by press-forming.

6. The hatchback door structure for vehicles according to claim 1, wherein the inner panel further comprises:
jointing portions on each of which are jointed the side portion of the frame and the stiffening rib,
a discrete lateral beam which extends between the jointing portions, and which comprises fixing portions and a beam portion extending between a pair of the fixing portions,
wherein each of the fixing portions is fixed on a respective one of the jointing portions, and
wherein the beam portion has a pair of cut-and-turned-up walls, each laterally protruding upward from each longitudinal side of the beam portion.

7. The hatchback door structure for vehicles according to claim 6, wherein the discrete lateral beam is formed in an arc shape so that the lateral beam protrudes in convex to an outer side of a vehicle, and a cross sectional width of the lateral beam gradually becomes smaller from a center to each of the ends of the lateral beam.

8. The hatchback door structure for vehicles according to any one of claims 6 and 7, wherein the discrete lateral beam is arranged so that a protruded direction of the lateral beam which is substantially perpendicular to an extending direction of the lateral beam is directed along an opening-closing direction of the hatchback door structure.

9. The hatchback door structure for vehicles according to claim 6, wherein said fixing portions on said jointing portions are formed so that said fixing portions are arranged on an identical plane defined in a vehicle width direction.

10. A hatchback door structure for vehicles according to claim 6,
wherein the discrete lateral beam is formed by press-forming in a direction such that surfaces of the cut-and-turned-up walls of the lateral beam are parallel with a tangential direction of a rotation circle of the hatchback door structure about the hinges provided on the frame; and
wherein a window frame on which a window glass attaches is formed in an upper portion of the frame.

11. The hatchback door structure for vehicles according to claim 10, wherein the press-forming direction of the discrete lateral beam is different from a press-forming direction of the inner panel.

12. The hatchback door structure for vehicles according to any one of claims 10 and 11, wherein the discrete lateral beam is fixed at approximately right angle against the frame of the inner panel at both bottom corners of the window frame.

13. The hatchback door structure for vehicles according to any one of claims 10 and 11, wherein a cross sectional width of the inner panel is different from a cross sectional width of the discrete lateral beam in an inside-outside direction of the hatchback door structure.

14. The hatchback door structure for vehicles according to any one of claims 10 and 11, wherein a material of the inner panel is different from a material of the discrete lateral beam.

15. The hatchback door structure for vehicles according to claim 1, wherein the inner panel and the outer panel are connected together by a hemming operation in peripheral portions of the inner panel and the outer panel.

16. The hatchback door structure for vehicles according to claim 4, wherein the cut-and-turned-up walls are formed to extend vertically intermediate sections of the side portions of the frame.

* * * * *